July 8, 1924.
F. WILMOTH
1,500,538
BOLL WEEVIL CATCHER
Filed Oct. 4, 1922          2 Sheets-Sheet 1
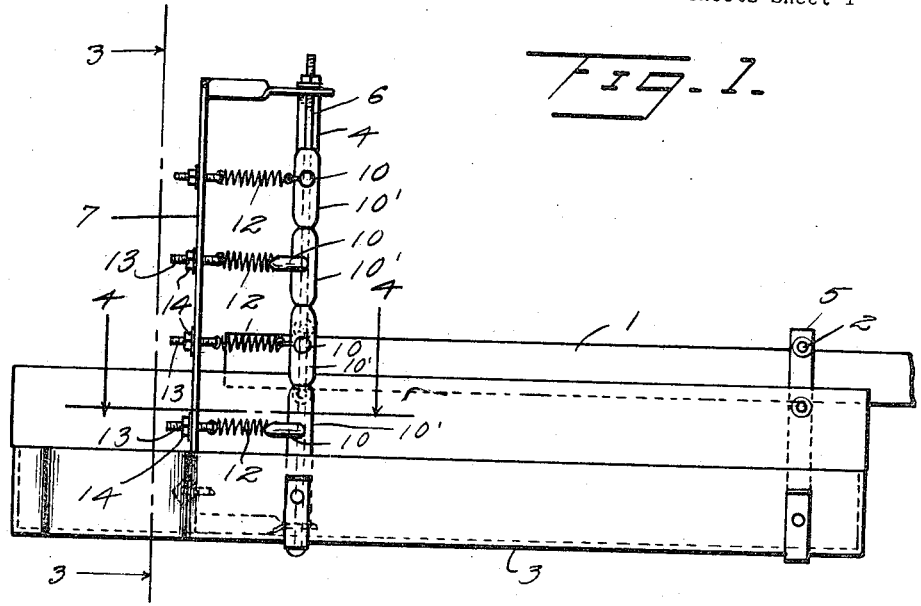
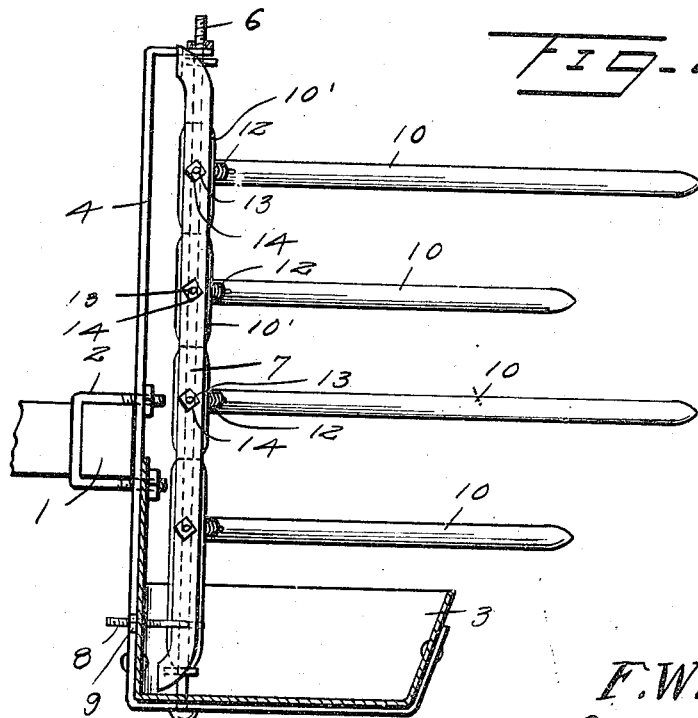
Inventor
F. Wilmoth.

July 8, 1924.
F. WILMOTH
BOLL WEEVIL CATCHER
Filed Oct. 4, 1922
1,500,538
2 Sheets-Sheet 2
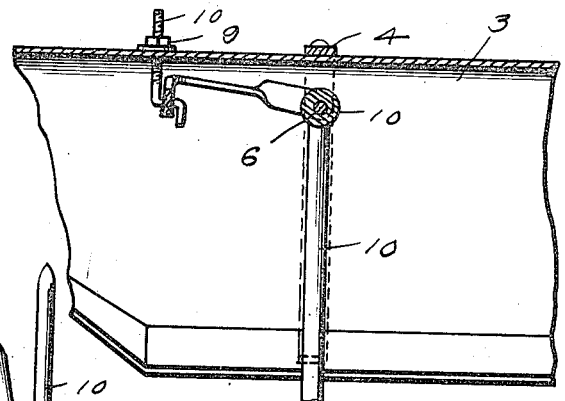
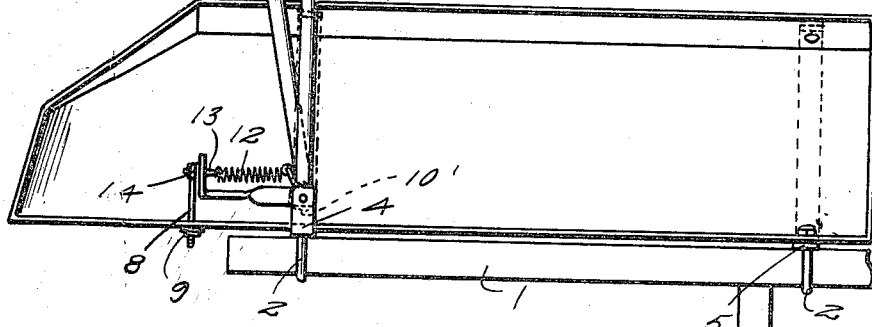
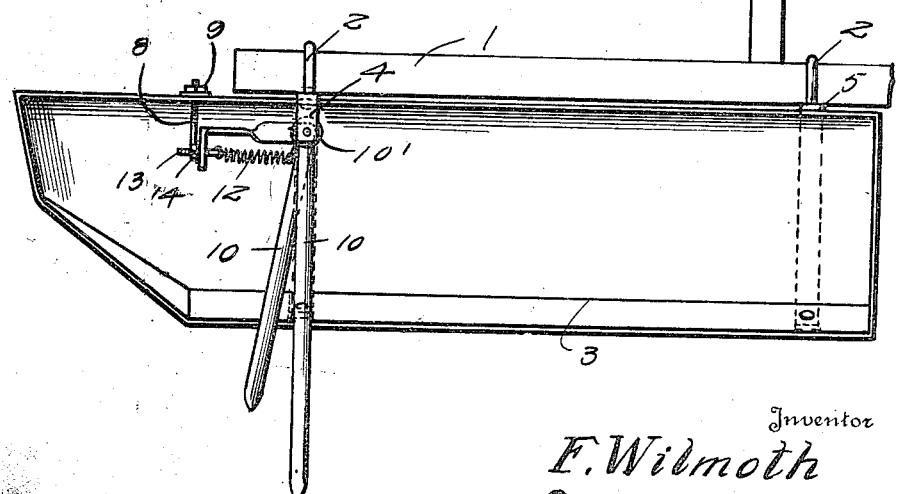
Inventor
F. Wilmoth Patented July 8, 1924.

1,500,538

UNITED STATES PATENT OFFICE.

FRANK WILMOTH, OF MIDLOTHIAN, TEXAS, ASSIGNOR, BY MESNE ASSIGNMENTS, TO STANDARD MANUFACTURING COMPANY, OF DALLAS, TEXAS, A CORPORATION OF TEXAS.

BOLL-WEEVIL CATCHER.

Application filed October 4, 1922. Serial No. 592,318.

*To all whom it may concern:*

Be it known that I, FRANK WILMOTH, a citizen of the United States, residing at Midlothian, in the county of Ellis and State of Texas, have invented certain new and useful Improvements in Boll-Weevil Catchers; and I do hereby declare the following to be a full, clear, and exact description of the invention, such as will enable others skilled in the art to which it appertains to make and use the same.

The invention has for its object the extermination of the boll weevil which is destructive to the cotton raising industry.

In accordance with the present invention, a pan is attached to the cultivator and a knocker mechanism is associated therewith for jarring or agitating the plants to dislodge the boll weevil therefrom which is received in the pan to be subsequently disposed of, or the pan may contain an insecticide such as kerosene which operates to kill the weevils and other worms and insects dropping into the pan.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side elevation illustrative of the invention,

Figure 2 is a top plan view,

Figure 3 is a section on the line 3—3 of Figure 1, and

Figure 4 is a horizontal section on the line 4—4 of Figure 1.

Corresponding and like parts are referred to in the following description and designated in the several views of the drawings by like reference characters.

The numeral 1 designates the beams of a cultivator such as generally used for cultivating cotton. A similar catcher is attached to the beams 1 by U-bolts 2 or analogous fastening means so that adjacent rows of cotton plants may be operated on as the cultivator is propelled therebetween. The catchers are made right and left, otherwise they are of like construction.

Each catcher consists of an elongated pan 3 which is long, narrow and relatively shallow, the outer forward corner being beveled and the inner wall being higher than the end and outer walls. Straps or brackets 4 and 5 are attached to opposite end portions of the pan and reinforce the same and receive the fastening means 2, whereby the catcher is attached to the cultivator. The front strap 4 extends some distance above the inner wall of the pan and its upper end is bent laterally and receives the upper end of a vertical rod 6, the lower end of which engages the horizontal portion of the strap 4 below the bottom of the pan. A U-frame 7 pivotally engages the rod 6 and its upright portion is adapted to be adjusted to a greater or less distance from the inner wall of the pan. For this purpose a rod 8 engages the frame 7 and extends through an opening formed in the inner wall of the pan and receives a nut 9 whereby the rod 8 and frame 7 may be adjusted.

A plurality of beaters 10 are pivotally mounted upon the rod 6, each beater consisting of a finger having a sleeve 10 at its inner end through which the rod 8 loosely passes. A contractile helical spring 12 is attached at one end to each of the beaters and its opposite end is adjustably connected to the upright portion of the frame 7. A threaded stem 13 has the outer end of each of the springs 12 connected thereto and said stem passes loosely through the upright portion of the frame 7 and receives a nut 14, whereby the stem 13 may be adjusted to position the beaters and vary the effective strength of the several springs coacting therewith. Adjustment of the frame 7 by means of the parts 8 and 9 effects a like result. The beaters are preferably of varying length, although this is not essential.

In practice, a catcher is applied to opposite sides of a cultivator and as the latter is advanced over the field between adjacent rows of cotton plants, the branches adjacent the cultivator are shook and jarred, thereby dislodging boll weevil, squares and other worms and insects which drop and are received in the pan 3 to be subsequently disposed of or killed by an insecticide placed in the pan.

What is claimed is:

1. A machine of the class described consisting of a pan, a vertically disposed bracket securing the pan in place, a rod fastened in vertical position and to said bracket, a substantially U-shaped frame pivoted on said rod, beaters journaled on said rod movable in substantially a horizontal plane over said pan, contractile springs fastened to said frame and to said beaters, and means connecting said frame to the pan.

2. A machine of the class described consisting of a pan, a securing bracket for the pan, a rod positioned by said bracket, a substantially U-shaped frame pivoted on said rod, beaters individually journaled on said rod and over said pan, a plurality of contractile springs adjustably fastened to said frame and individually fastened to said beaters, and an adjustable fastening connecting said frame to the pan.

In testimony whereof I affix my signature in presence of two witnesses.

FRANK WILMOTH.

Witnesses:
T. C. PERRY,
H. EDWOOT.